United States Patent [19]
Wada et al.

[11] Patent Number: 5,305,157
[45] Date of Patent: Apr. 19, 1994

[54] READ CIRCUIT PROVIDING TWO DIFFERENT REFERENCE LEVELS FOR READING THE SERVO SECTORS AND DATA SECTORS OF A ROTATING DATA STORAGE DISK

[75] Inventors: Sumio Wada, Koga; Keishi Ueno, Fuchu, both of Japan

[73] Assignee: TEAC Corporation, Tokyo, Japan

[21] Appl. No.: 965,797

[22] Filed: Oct. 23, 1992

[30] Foreign Application Priority Data

Oct. 25, 1991 [JP] Japan ................................. 3-306779

[51] Int. Cl.$^5$ ............................ G11B 5/09; G11B 5/02
[52] U.S. Cl. .......................................... 360/53; 360/67
[58] Field of Search ................... 360/55, 78.14, 53, 67,
360/46, 45, 51, 40, 44, 65, 43, 22, 48, 77.08,
78.14, 77.01, 78.02, 77.07; 324/73

[56] References Cited

U.S. PATENT DOCUMENTS

| | | | |
|---|---|---|---|
| 4,313,140 | 1/1982 | Keidl | 360/77.07 |
| 4,318,141 | 3/1982 | Haynes | 360/77.01 |
| 4,392,164 | 5/1983 | Lequien | 360/77.08 |
| 4,646,175 | 2/1987 | Sokolik et al. | 360/78.02 |
| 4,722,010 | 1/1988 | Suzuki et al. | 360/46 |
| 4,724,495 | 2/1988 | Hedberg et al. | 360/48 X |
| 4,729,045 | 3/1988 | Baugh | 360/53 |
| 4,907,100 | 3/1990 | Nishiyama et al. | 360/45 |
| 5,079,654 | 1/1992 | Uno et al. | 360/78.14 |

Primary Examiner—Donald Hajec
Assistant Examiner—Patrick Wamsley
Attorney, Agent, or Firm—Woodcock Washburn Kurtz Mackiewicz & Norris

[57] ABSTRACT

A hard disk drive is disclosed in which the disk has tracks each divided into alternating data sectors and servo sectors, with the control data such as track addresses on the servo sectors being normally recorded more stably than the main data on the data sectors. In order to obtain read pulses representative of the peaks of the output waveform of a transducer, this waveform is directed on one hand into a differentiator circuit and thence into a wave shaping circuit for the provision of data pulses which rise and decay in synchronism with the peaks of the transducer output waveform. On the other hand, the transducer output waveform is sent into a gate pulse circuit, in which the waveform is compared with a reference signal in order to provide gate or window pulses. A logic circuit is provided for ascertaining whether the data pulses rise and decay within the durations of the gate pulses and, if they do, for producing read pulses indicative of the rises and decays of the data pulses. The duration of the gate pulses is made shorter for recovery of the control data than for main data recovery, with a view to more precise detection of the peaks of the transducer output waveform representative of the control data.

6 Claims, 9 Drawing Sheets

READ CIRCUIT PROVIDING TWO DIFFERENT REFERENCE LEVELS FOR READING THE SERVO SECTORS AND DATA SECTORS OF A ROTATING DATA STORAGE DISK

BACKGROUND OF THE INVENTION

This invention relates generally to rotating disk data storage apparatuses; and particularly to that of the hard or "fixed" magnetic disk variety. More particularly, the invention deals with an improved read circuit in such apparatus for accurately reading data on both data sectors and servo sectors of the rotating disk.

The hard magnetic disk has a multiplicity of annular tracks arranged concentrically on at least one major surface thereof. Each track is divided into sectors, with intersector gaps therebetween, and each sector is subdivided into a data sector and a servo sector. The data sectors are used for the storage of main data or user information. The servo sectors have written thereon various control data such as automatic gain control (AGC) data, track addresses, and tracking servo patterns, and have mid-sector gaps aside from the intersector gaps. Read by the data transducer of an associated disk drive, all such data, on both data sectors and servo sectors of the disk are recreated from read pulses representative of the peaks of the transducer output waveform. The gaps in the disk tracks perform an important function of enabling the disk drive to detect the servo sectors.

As heretofore constructed, a read circuit, included in the hard disk drive, has had a problem in reconstructing the main data and control data on the disk. As is customary in the magnetic disk art, the main data is so recorded on the disk that the transducer on reading it produces an output of shorter wavelength and smaller amplitude than that produced on reading the control data. It may be comtemplated to make the reference level of wave shaping comparators in the read circuit low enough to enable exact recreation of the main data. Then, since this same low reference level has so far been used also for recreating the control data, difficulties have been encountered in detecting the peaks of the transducer output waveform representative of the control data. Such difficulties have led in some cases to failures in detecting the gaps and hence the servo sectors of the disk tracks.

The problem discussed above has become all the more pronounced in cases where an AGC is coupled to the output of the transducer. The intersector gaps as well as those in the servo sectors typically to carry noise magnetizations. These noise magnetizations have been so amplified as to result in the production of wrong read pulses if the gain is so determined as to suit the smaller amplitude transducer output representative of the main data. Such noise has also found its way into the read circuit, making impossible the correct reading of the track addresses and other control data, when the threshold level is made too low for reading the control data.

SUMMARY OF THE INVENTION

The present invention seeks to recreate information from both data sectors and servo sectors of tracks on a rotating magnetic disk or the like with equal accuracy and reliability.

Briefly, the invention may be summarized as an apparatus having a transducer for data transfer with a rotating disk having a multiplicity of annular tracks arranged concentrically thereon, each track being divided into a plurality of data sectors for the storage of main data and a plurality of servo sectors for the storage of control data such as track addresses. More particularly, the invention resides in a system in such apparatus for producing read pulses indicative of peaks of a waveform produced by the transducer on reading the disk. The system comprises reference circuit means for providing a reference signal, and level setting circuit means connected to the reference circuit means for setting the reference signal at a first predetermined magnitude when the transducer output waveform represents the main data, and at a second magnitude, different from the first magnitude, when the transducer output waveform represents the control data. Connected to the transducer and the reference circuit means, comparator means compares the transducer output waveform with the reference signal and produces output pulses indicative of whether the transducer output waveform is greater than the reference signal, the output pulses of the comparator means having either of two different durations depending upon whether the reference signal has the first or the second magnitude. Also included are circuit means connected to the comparator means for producing read pulses from the output pulses of the comparator means.

Preferably, the comparator means may be used for the provision of gate or window pulses indicative of whether the transducer output waveform is greater than the reference signal which may be derived from the transducer output waveform. The gate pulses will have either of two different durations depending upon whether the reference signal has the first or the second magnitude. The transducer output is also directed into wave shaping circuit means for the provision of data pulses which rise and decay in synchronism with the peaks of the transducer output waveform. It is subsequently ascertained whether the data pulses rise and decay within the durations of the gate pulses, and if they do, read pulses are generated in step with the rises and decays of the data pulses.

In order to set the gate pulses at either of the two different durations, the familiar write enable signal can be utilized which has either of two different states depending upon whether the transducer is reading the data sectors or servo sectors of the disk. The write enable signal is generated by a timing circuit in response to the read pulses.

With the reference signal automatically varied between two predetermined levels as above, the peaks of the transducer output waveform are detectable more precisely when the transducer is reading the control data than when it is reading the main data. Such precise recreation of the control data leads, of course, to the accurate detection of the track gaps and, in consequence, of the servo sectors, ultimately resulting in the correct reading of all the information on the disk. The track addresses included in the control data can also be read in a noise immune manner.

The above and other features and advantages of this invention and the manner of realizing them will become more apparent, and the invention itself will best be understood, from a study of the following description and appended claims, with reference to the attached drawings showing the closest prior art and the preferred embodiments of the invention.

DESCRIPTION OF THE PREFERRED EMBODIMENTS

Figure 1:
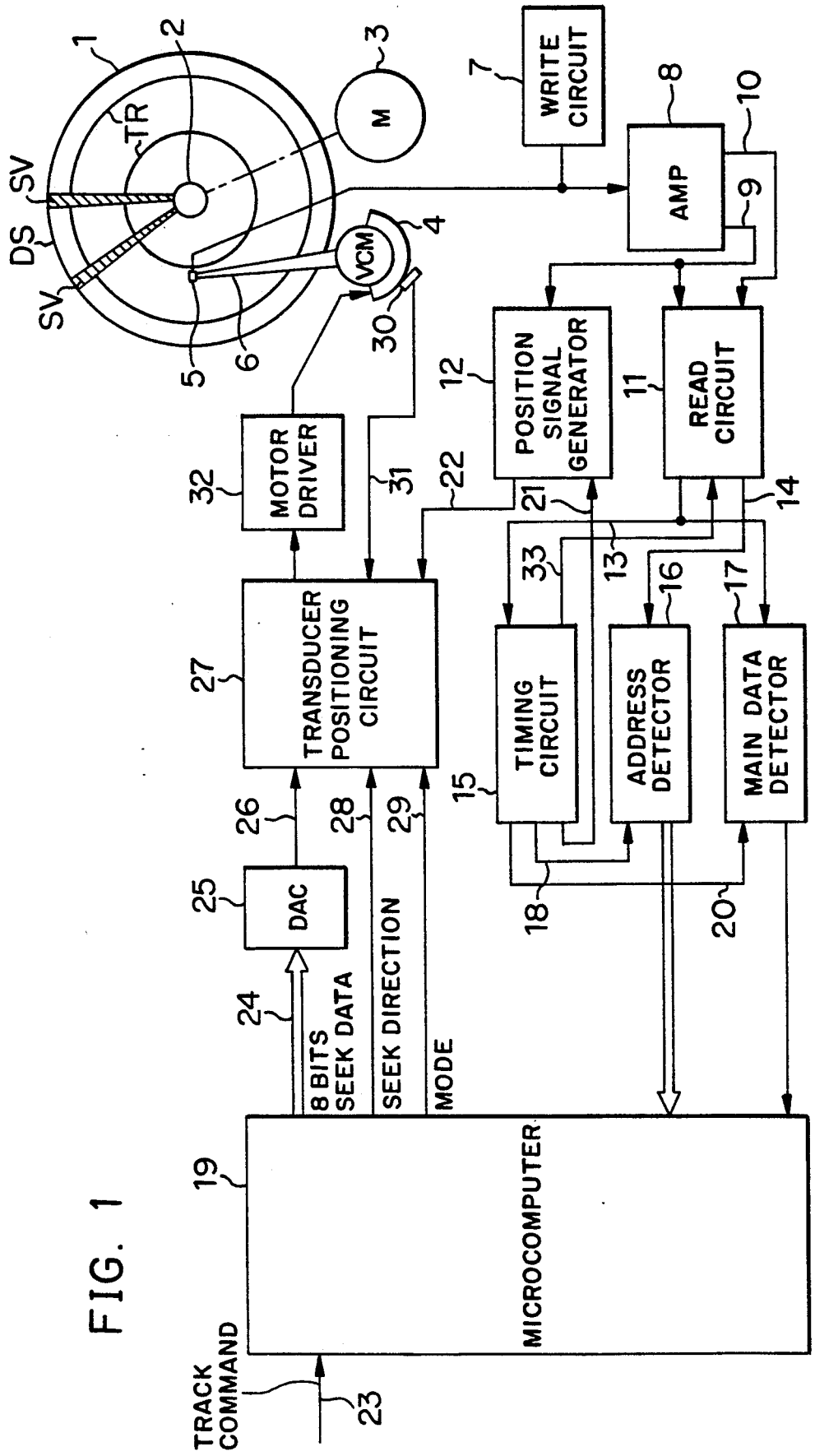
FIG. 1 is a block diagram of a hard disk drive incorporating the novel concepts of this invention.

The invention will now be described in detail as embodied in the hard disk drive illustrated in FIG. 1. The disk drive has a hard magnetic disk 1 fixed to a hub 2 which is driven directly by an electric disk drive motor 3. The disk 1 has a multiplicity of, two shown, annular record tracks TR arranged concentrically on one of its major surfaces. Data is recorded on these tracks in a predefined format.

A magnetic data transducer 5 is mounted to a distal end of a support arm 6 which is proximally coupled to an electric transducer positioning motor 4. Typically, the positioning motor takes the form of a known voice coil motor capable of transporting the transducer 5 across the tracks TR on the disk 1 and positioning the same on any desired one of the tracks as the coil, not shown, is energized with a controlled current. The transducer 5 is electrically coupled to a write circuit 7 on one hand and, on the other hand, to an amplifier circuit 8 having an automatic gain control built into it.

All the tracks TR on the disk 1 are divided into a plurality (e.g. forty three) of sectors, and each sector is subdivided into a servo sector SV and a data sector DS. The servo sectors are shown hatched for clarity. Each track is therefore divided into equal numbers of alternating servo sectors SV and data sectors DS.

Figure 2:
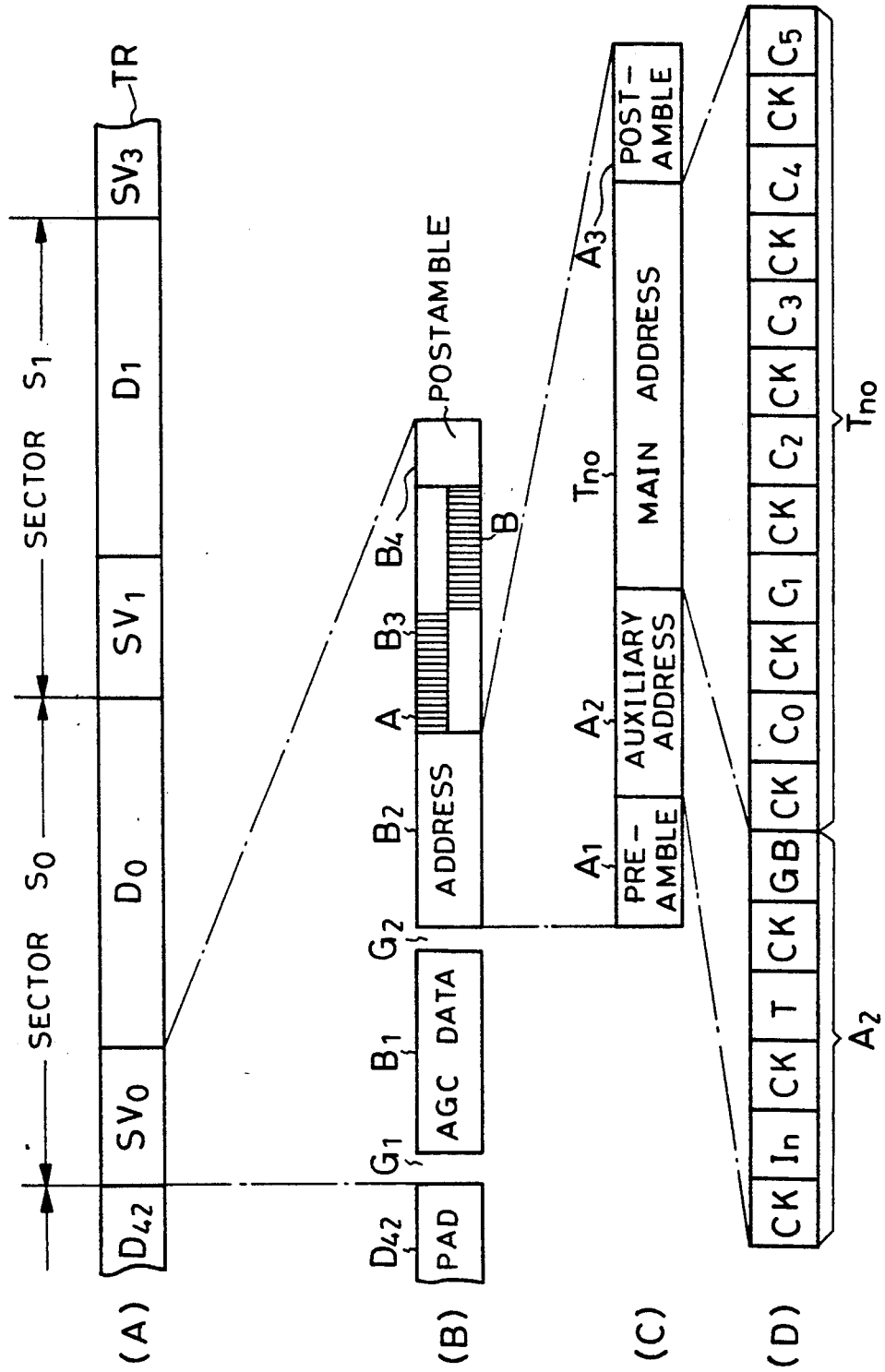
FIG. 2, consisting of (A) through (D), is a series of diagrams explanatory of the track format of the hard disk used in the FIG. 1 apparatus.

As more clearly indicated at (A) in FIG. 2, each of the track sectors $S_0$, $S_1$, . . . is subdivided into a servo sector $SV_0$, $SV_1$, . . . and a data sector $D_0$, $D_1$, . . . FIG. 2 shows at (B) that each servo sector comprises a first or intersector gap $G_1$, an AGC data zone $B_1$, a second or mid-sector gap $G_2$, an address zone $B_2$, a tracking servo zone $B_3$ and a postamble $B_4$, which are arranged in that order.

The illustrated intersector gap $G_1$ follows the pad, which is magnetized, at the trailing end of the data sector $D_{42}$ of the last track sector. The length (dimension in the longitudinal direction of the track) of the intersector gap $G_1$ is equivalent to the transfer time (two microseconds) of two bytes (16 bits) of main data on the data sectors. The AGC data zone $B_1$ is for the storage of AGC data needed by the AGC built into the amplifier circuit 8, FIG. 1, which is coupled directly to the transducer 5. The length of this AGC data zone $B_1$ is equivalent to the transfer time (16 microseconds) of 16 bytes of main data. Disposed between AGC data zone $B_1$ and address zone $B_2$, the mid-sector gap $G_2$ has a length equivalent to the transfer time (one microsecond) of one byte of main data.

As will be noted from (C) in FIG. 2, the address zone $B_2$ of each servo sector further resolves itself into a preamble $A_1$, a first or auxiliary address zone $A_2$, a second or main address zone Tno and a postamble $A_3$. The length of the preamble $A_1$ is equivalent to the transfer time of two bytes of main data.

FIG. 2 further shows at (D) that the auxiliary address zone $A_2$ has an index data zone In, a Track Zero detection data zone T and a guard band data zone GB, each having a length equivalent to the transfer time (0.5 microsecond) of a half byte of main data. The first address zone $A_2$ additionally comprises three noise guard zones CK, each storing a logic one, which have each a length also equivalent to the transfer time of a half byte of main data. The complete length of the first address zone $A_2$ is therefore three microseconds.

The index data In on the first track sector $S_0$ indicates the beginning, that is, the sector $S_0$, of one track and so distinguishes the first track sector from all the other sectors $S_1$–$S_{42}$. The index data on the first track sector $S_0$ is a logic zero whereas the index data on the other track sectors $S_1$–$S_{42}$ are all logic ones.

The Track Zero detection data T is used for discriminating Track Zero from all the other tracks. Logic zeros are written on Tracks Zero, One, Two and Three, as well as on all the outer guard band tracks, and logic ones are written on all the other tracks. Track Zero is detected from the Track Zero detection data T combined with the main address data on the zone Tno.

The guard band data GB identify the outer guard band tracks. Logic zeros are written from the sixth to thirty seventh guard band tracks, and logic ones on all the other guard bands and on all the data tracks.

As shown also at (D) in FIG. 2, the main address zone Tno stores six bits $C_0$–$C_5$ of a Gray coded track address which alternate with noise guards Ck. The length of the main address zone Tno is six microseconds, each address and noise guard bit being a half byte long. It is understood that all the tracks TR on the disk 1 are divided into a plurality of groups, and one and the same set of addresses are assigned to each group of tracks. In this manner, being required to uniquely identify one of the tracks making up each group, instead of one of all the tracks on the disk, each track address can be composed of only the six bits $C_0$–$C_5$. Reference may be had to Uno et al. U.S. Pat. No. 5,079,654 for more details on such track addresses and how such addressed tracks are accessed.

The postamble $A_3$ of the address zone $B_2$ stores eight logic ones. The length of this postamble is four microseconds.

Additionally, each servo sector has the tracking servo zone $B_3$ after the address zone $B_2$, as at (B) in this figure. The tracking servo zone B3 has recorded thereon servo patterns A and B offset in opposite directions from the track centerline. Then comes the postamble B4 which is four microseconds long.

The data sectors $D_0$, $D_1$, ... each contain an identification field and a data field. Main or user data is recorded on the data fields of the data sectors.

Figure 8:
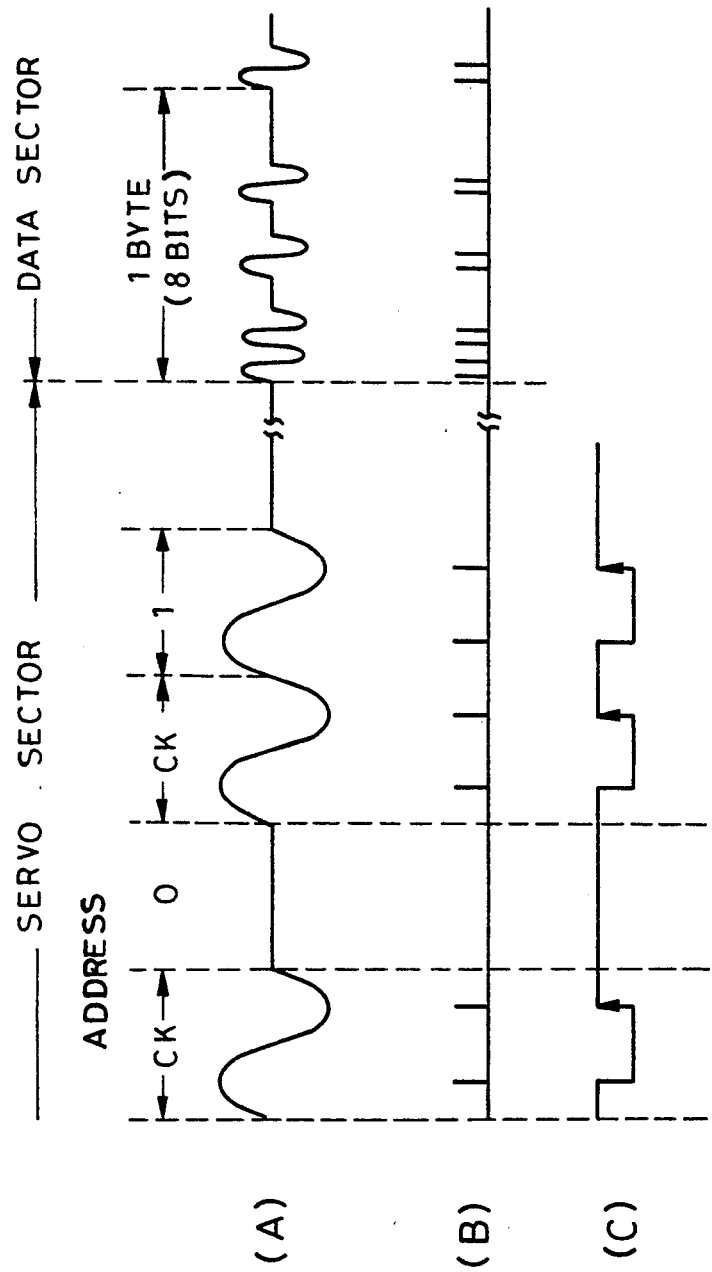
FIG. 8, consisting of (A) through (C), is a series of waveform diagrams showing by way of example the waveform produced by the transducer of the FIG. 1 apparatus, and the read pulses and read data obtained from the transducer output waveform.

Reference may be had briefly to FIG. 8 for a consideration of how the information on the disk 1 is electrically represented by the output from the transducer 5. This figure shows at (A) one of the two opposite phase waveforms produced by the amplifier circuit 8, FIG. 1, when the transducer 5 scans part of the track address in one servo sector and part of one data sector. It will be noted that the six bits of the track address are each either logic one or logic zero and are arranged alternately with the noise guard bits CK which are all logic ones. Each logic one is represented by one cycle of alternating wave. The address bits and the noise guard bits are all of the same time duration. The amplified transducer output representative of the main data from the data sector, however, has a wavelength only a quarter of that representative of the control data and, normally, is less in amplitude.

With reference back to FIG. 1 the amplifier circuit 8 is of differential construction having two opposite phase output lines 9 and 10. Both output lines are connected to a read circuit 11, and the first output line 9 is additionally connected to a position signal generator circuit 12. The read circuit 11 produces read pulses from the incoming opposite phase waveforms from the amplifier circuit 8. The read pulses are sent over a line 13 to both timing circuit 15 and main data detector circuit 17. The read circuit 11 further processes the read pulses for producing a signal that is supplied to an address detector circuit 16 over a line 14. The read circuit 11 is shown in detail in FIG. 3, to which reference will be had presently.

Responding to a timing signal supplied from the timing circuit 15 over a line 18, the address detector circuit 16 derives the auxiliary track data In, T and GB and main track addresses $C_0$–$C_5$ from the read signal supplied from the read circuit 11 and sends such track information to a microcomputer 19. The main data detector circuit 17 also responds to a timing signal supplied from the timing circuit 15 over a line 20 for reconstructing read data from the read pulses as a replica of the main data that has been stored on and retrieved from the disk 1. The read data is also sent to the microcomputer 19.

The position signal generator circuit 12 derives the servo patterns A and B, FIG. 2(B), from the amplified transducer output in response to a timing signal fed from the timing circuit 15 over a line 21. Further the position signal generator circuit 12 determines the difference between the servo patterns A and B for generating a transducer position signal indicative of the degree of possible misalignment of the transducer with the track centerline. The transducer position signal is sent to a transducer positioning circuit 27 over a line 22 for tracking control of the transducer 5 at the end of each track seek operation.

Among the functions of the microcomputer 19 is the positional control of the transducer 5 with respect to the tracks TR on the disk 1. To this end the microcomputer 19 is coupled to the transducer positioning circuit 27 by way of an eight bit seek data bus 25, a digital to analog converter (DAC) 25 and a line 26 and further by way of a seek direction signal line 28 and a mode signal line 29.

Inputting a track command from a host system, not shown, over a line 23, the microcomputer 19 puts out seek data necessary for causing the voice coil motor 4 to position the transducer over the commanded destination track. The positioning circuit 27 responds to the analog equivalent of the seek data by causing a motor driver circuit 32 to energize the voice coil motor 4 accordingly. The seek direction signal on the line 28 indicates whether the transducer is to be moved radially inwardly or outwardly of the disk. The mode signal on the line 29 sets the positioning circuit 27 in either the seek mode or the tracking mode, causing the positioning circuit 27 to proceed to the tracking mode after the transducer has been positioned over the destination track in the seek mode of operation.

At 30 is seen a transducer speed sensor for producing, on its output line 31 leading to the transducer positioning circuit 27, a transducer speed signal indicative of the traveling speed of the transducer 5. During track seek operation the positioning circuit 27 relies on the seek data and the transducer speed signal for positioning the transducer over the destination track. For tracking control, as has been mentioned, the positioning circuit 27 relies on the output from the position signal generator circuit 12 in order to position the transducer in centerline alignment with the destination track.

Figure 3:
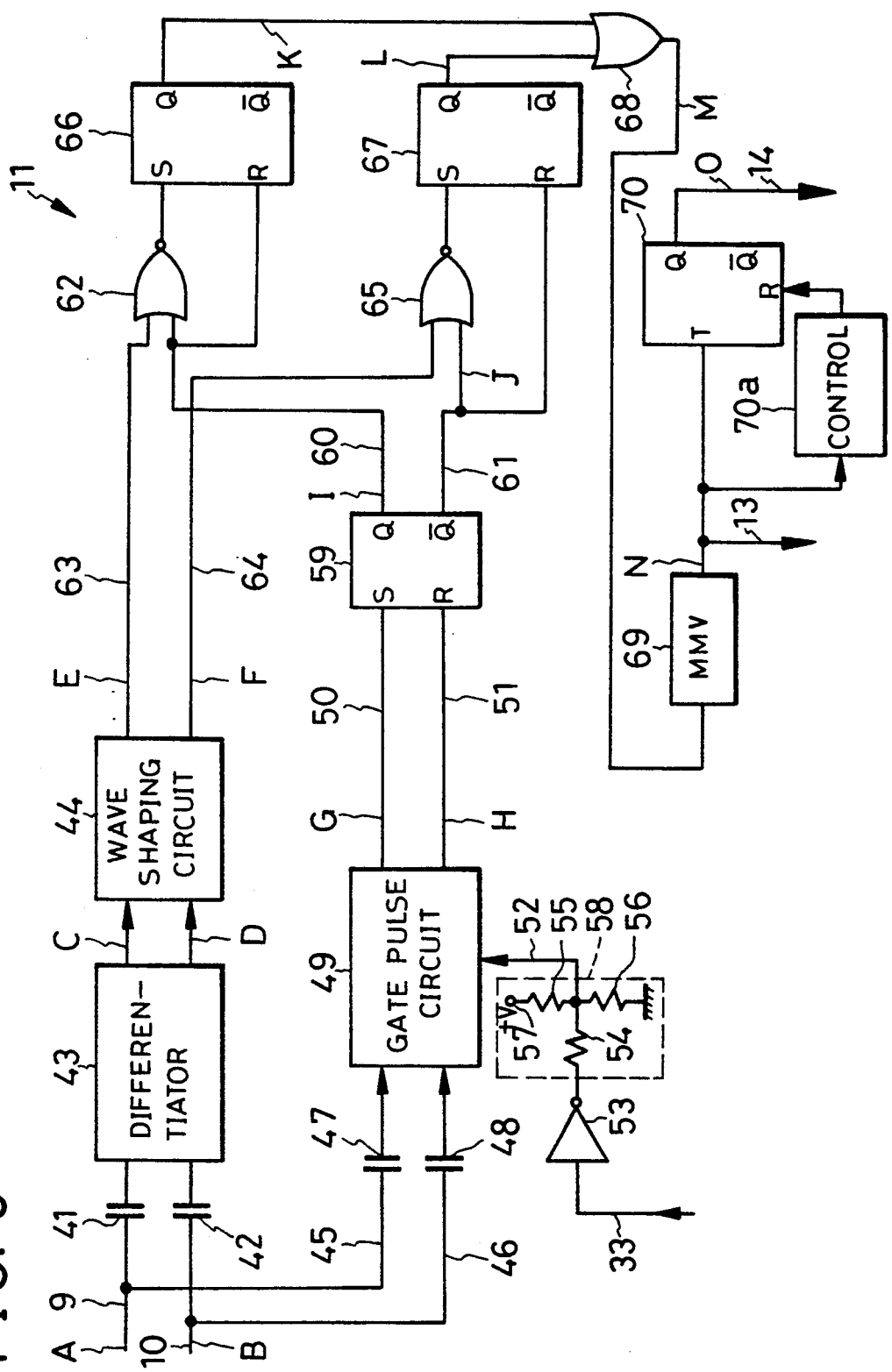
FIG. 3 is a block diagram showing in detail a read circuit included in the FIG. 1 apparatus.

Reference is now invited to FIG. 3 for the detailed discussion of the read circuit 11. Such discussion will be better understood by referring also to FIGS. 4 and 5, each showing at (A) through (O) the waveforms appearing in the correspondingly designated parts of the FIG. 3 circuit.

The read circuit 11 has a differentiator circuit 43 having two inputs connected to the pair of output lines 9 and 10 of the amplifier circuit 8, FIG. 1, via coupling capacitors 41 and 42, respectively. Assume that, as indicated at (A) and (B) in FIG. 4, the opposite phase amplifier outputs represent a logic one noise guard followed by a logic one track address bit. Then the corresponding outputs from the differentiator circuit 43 will be as shown at (C) and (D) in FIG. 4.

These outputs from the differentiator circuit 43 are directed into a differential wave shaping circuit 44. Comprising zero volt comparators, the wave shaping circuit 44 modifies the differentiator outputs into what are herein termed the data pulses, shown at (E) and (F) in FIG. 4. The rises and decays of these data pulses substantially agree in time with the positive and negative peaks of the amplified transducer output waveforms shown at (A) and (B) in FIG. 4.

The pair of amplifier output lines 9 and 10 are also connected to a differential gate pulse circuit 49 by way of lines 45 and 46 shown branching off therefrom and having coupling capacitors 47 and 48 thereon. The gate pulse circuit 49 modifies the opposite phase amplifier outputs into the two series of gate pulses shown at (G) and (H) in FIG. 4. These gate pulses, which might also be termed window pulses, are generated in synchronism with the peaks and neighboring parts of the amplified transducer output waveforms. The gate pulse circuit 49 has a control line 52 to which the output line 33, FIG. 1, of the timing circuit 15 is connected via a NOT circuit 53 and a reference circuit 58 comprising resistors 54, 55 and 56 and a supply terminal 57. The gate pulse circuit 49 will be later described in more detail with reference to FIG. 6.

The pair of output lines 50 and 51 of the gate pulse circuit 49 are connected to the set input S and reset input R, respectively, of an RS flip flop 59. Thus the flip flop 59 produces on its output lines 60 and 61 the two opposite phase pulse trains shown at (I) and (J) in FIG. 4.

The output line 60 of the flip flop 59 is connected to a NOR gate 62, the other input of which is connected to the output line 63 of the wave shaping circuit 44. The other output line 61 of the flip flop 59 is connected to a second NOR gate 65, the other input of which is connected to the output line 64 of the wave shaping circuit 44. The output of the first recited NOR gate 62 is connected to the set input S of a second RS flip flop 66. The reset input R of this flip flop is connected to the output line 60 of the first mentioned flip flop 59. The output of the second NOR gate 65 is connected to the set input S of a third RS flip flop 67, the reset input R of which is connected to the output line 61 of the first flip flop 59. Thus the noninverting outputs Q of the flip flops 66 and 67 provide the rectangular waves indicated at (K) and (L) in FIG. 4. These outputs from the flip flops 66 and 67 are both directed into an OR gate 68. The resulting output from the OR gate 68 is as shown at (M) in FIG. 4.

Figure 4:
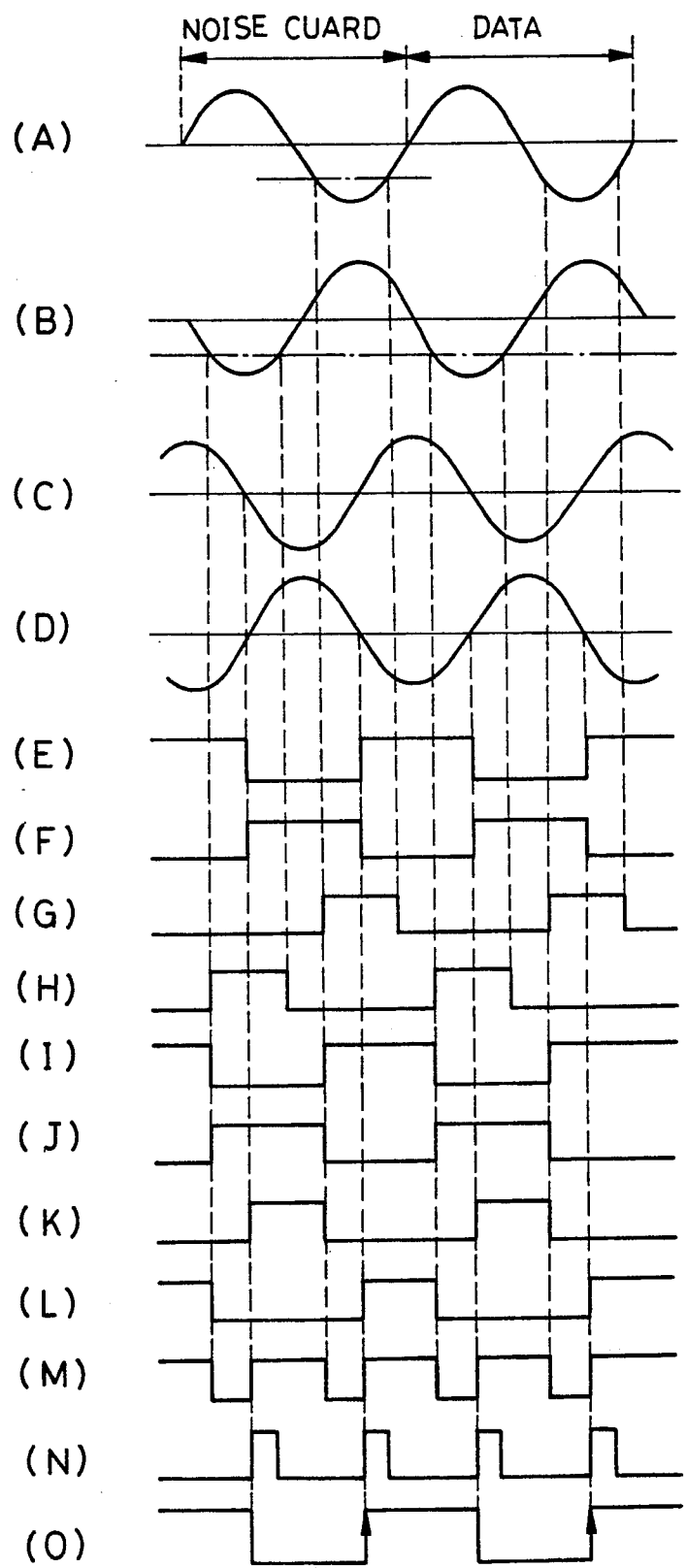
FIG. 4, consisting of (A) through (O), is a series of waveform diagrams useful in explaining the normal operation of the FIG. 3 read circuit.

In short, the noted three flip flops 59, 66 and 67, two NOR gates 62 and 65, and one OR gate 68 constitute in combination a logic circuit for ascertaining whether the FIG. 4 (E) and (F) data pulses from the wave shaping circuit 44 rise and decay during the durations of the FIG. 4 (G) and (H) gate or window pulses from the gate pulse circuit 49. If they do, the logic circuit produces the FIG. 4 (M) output indicative of the peaks of the transducer output waveforms.

Connected to the output of the OR gate 68 is a monostable multivibrator (MMV) 69, which puts out the desired read pulses, as at (N) in FIG. 4, in response to the leading edges of the OR gate output pulses. The read pulses are sent as aforesaid to the timing circuit 15 and main detector circuit 17, both shown in FIG. 1, over the line 13.

The output of the MMV 69 is further connected to the trigger input T of a trigger flip flop 70. As indicated at (O) in FIG. 4, the Q output from the flip flop 70 alternately switches between two states in response to the leading edges of the read pulses. This output from the flip flop 70, shown at (O) in FIG. 4, is sent to the address detector circuit 16, FIG. 1, over the line 14 for deriving the track addresses and auxiliary address data therefrom.

At (O) in FIG. 4 are shown the address read pulses as rising in synchronism with the negative peaks of the amplified transducer output waveform at (A) in FIG. 4. In order to achieve this the output of the MMV 69 is additionally connected to a flip flop control circuit 70a, the output of which is connected to the reset input R of the flip flop 70. The flip flop control circuit 70a comprises a counter, not shown, for holding the flip flop 70 reset until a predetermined odd number (typically five) of read pulses are counted after the start of each address zone. The flip flop 70 and its control circuit 70a, shown included in the read circuit 11 in FIG. 3, might be considered parts of the address detector circuit 16.

Figure 5:
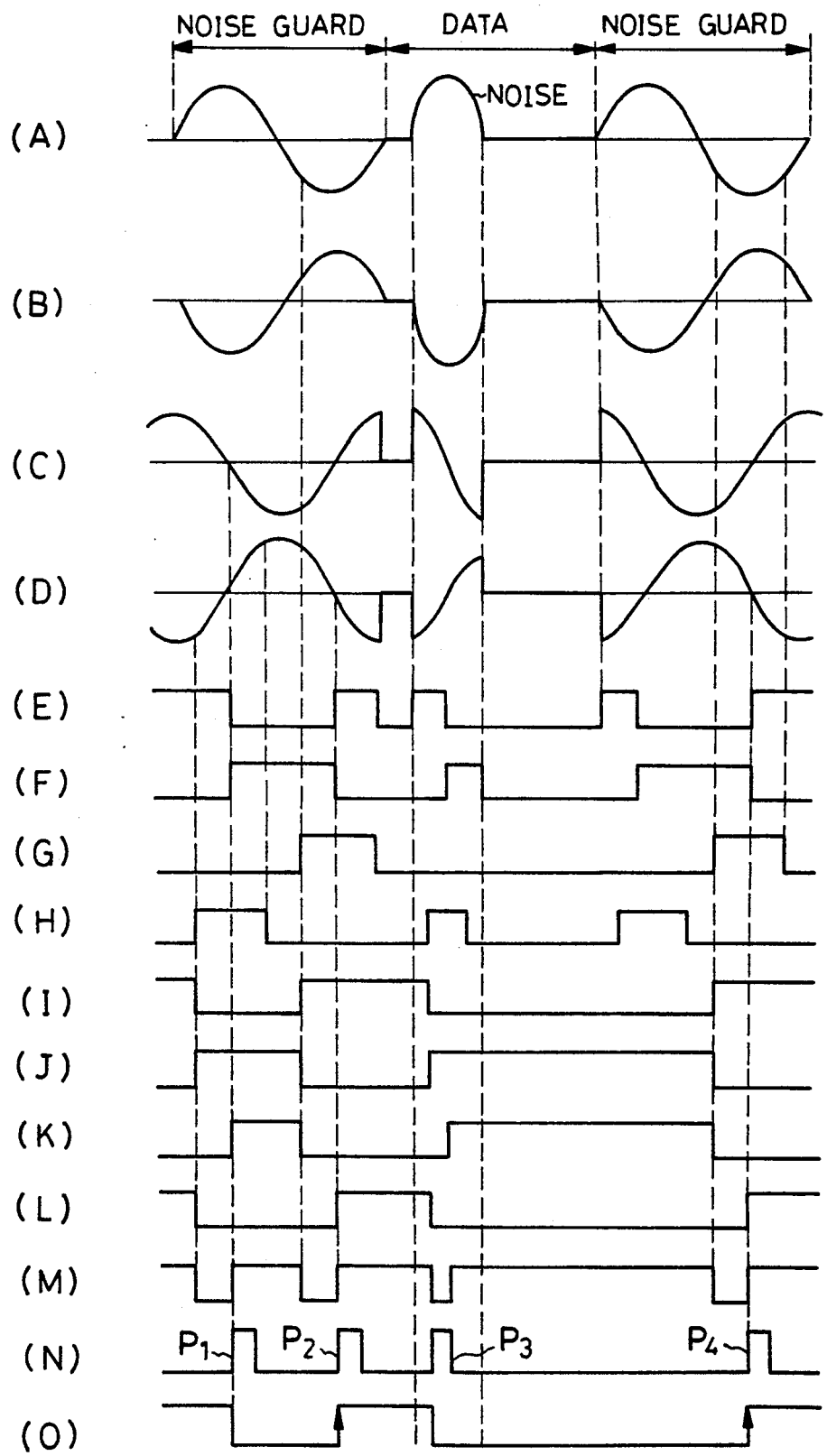
FIG. 5, consisting of (A) through (O), is a series of waveform diagrams useful in explaining the operation of the FIG. 3 read circuit in the case where a noise magnetization exists on the disk.

FIG. 5 is a series of waveform diagrams similar to FIG. 4 except that a noise magnetization exists at some bit of any track address on the disk, which bit should have been left unmagnetized to represent a logic zero, between two noise guards. In this case, too, as in the case depicted in FIG. 4, the two read pulses $P_1$ and $P_2$ will be generated as at (N) in FIG. 5 to represent the positive and negative peaks of the first noise guard. Another read pulse $P_3$ will then be generated to represent the noise on the address bit.

However, the read circuit 11 will not respond to the positive peak of the noise guard that comes after the noise. This nonresponse is because the flip flop 66, FIG. 3, of the read circuit 11 will have been set by the noise and remain so until the negative half cycle of the next noise guard. No read pulse will therefore appear in response to the positive peak of the noise guard following the noise, so that all the address bits will be read without being substantially affected by such noise. In the case where data are read on the basis of the positive peaks, instead of negative peaks as in the above described case, of the amplified transducer output shown at (A) in FIGS. 4 and 5, the alternate arrangement of address bits and logic one noise guards is effective to reduce to a minimum the displacement of the positive peaks representative of the address bits.

Figure 6:
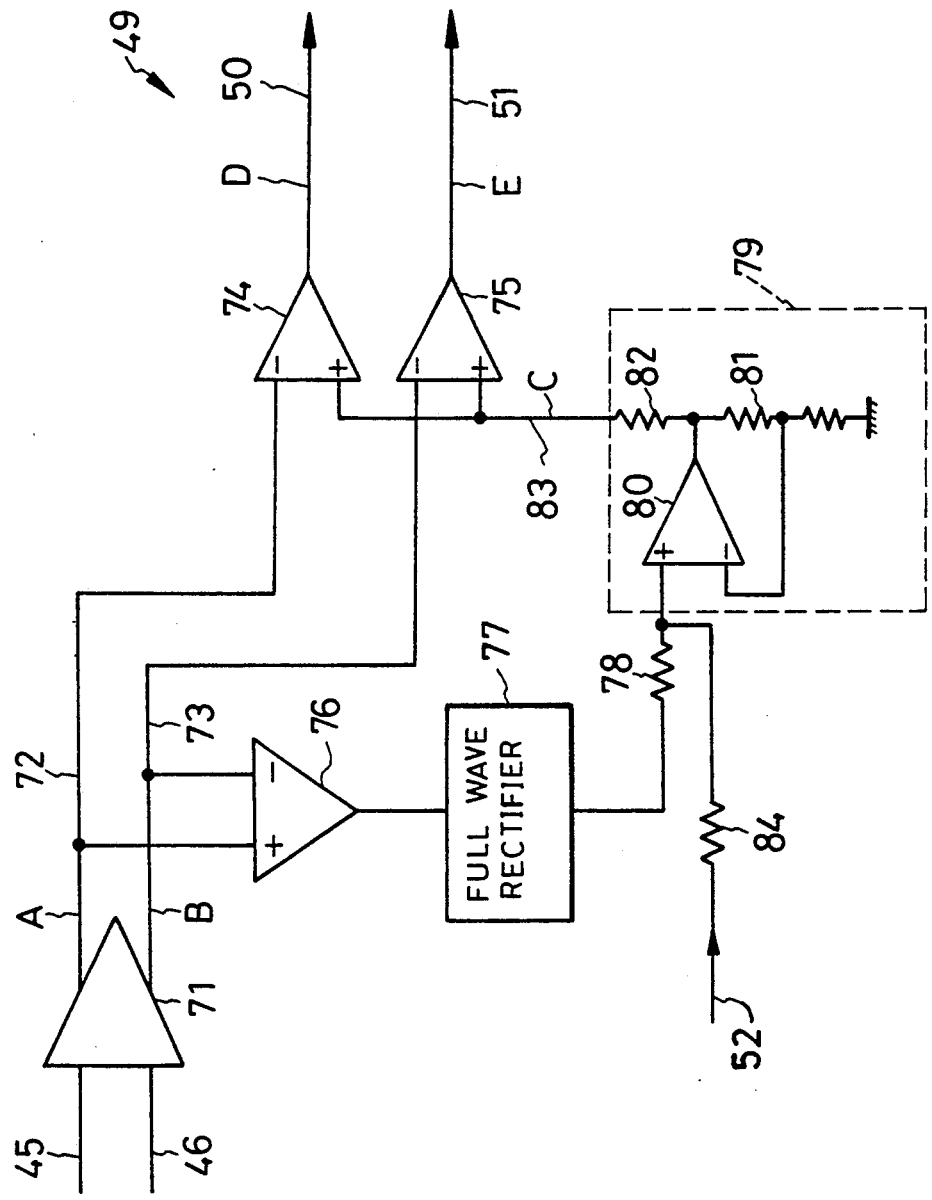
FIG. 6 is a block diagram showing in detail a gate pulse circuit included in the FIG. 3 read circuit.
Figure 7:
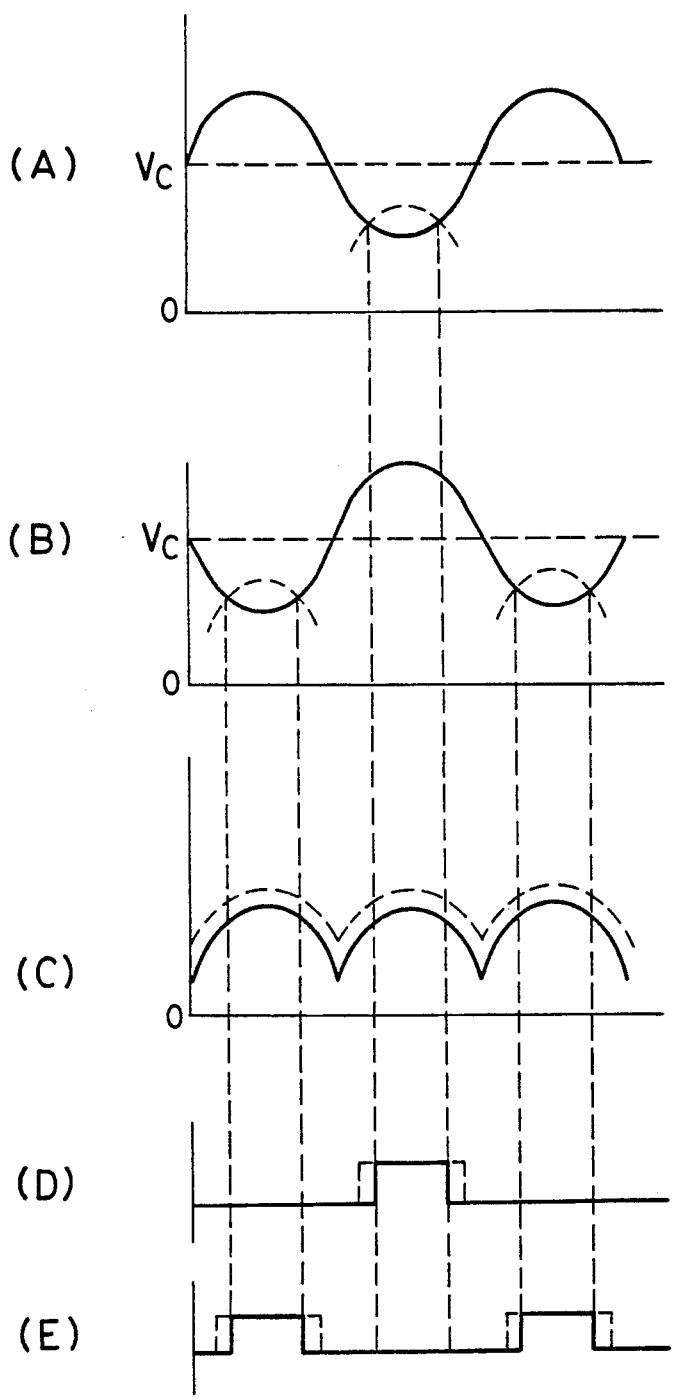
FIG. 7, consisting of (A) through (E), is a series of waveform diagrams useful in explaining the operation of the FIG. 6 gate pulse circuit.

FIG. 6 is a detailed illustration of the gate pulse circuit 49 included in the FIG. 3 read circuit. FIG. 7 shows at (A) through (E) the waveforms appearing in the correspondingly designated parts of the FIG. 6 circuit.

The pair of input lines 45 and 46 of the gate pulse circuit 49 are connected to a differential amplifier 71. The pair of differential output lines 72 and 73 of this differential amplifier are connected to a pair of comparators 74 and 75, respectively, and also to another differential amplifier 76. As the differential amplifier 71 provides the pair of opposite phase outputs shown at (A) and (B) in FIG. 7, with the same direct bias voltage Vc, the other differential amplifier 76 will put out a signal representative of the difference between the two inputs.

Inputting the output from the differential amplifier 76, a full wave rectifier circuit 77 delivers its output to a noninverting amplifier circuit 79 via a resistor 78. The amplifier circuit 79 comprises an operational amplifier 80 and two resistors 81 and 82. The output produced by this amplifier circuit on its output line 83 is as depicted at (C) in FIG. 7.

The line 33, FIGS. 1 and 3, for inputting from the timing circuit 15, FIG. 1, a control signal equivalent to the write enable signal generated by the timing circuit is coupled to the amplifier 80, FIG. 6, via the NOT circuit 53, FIG. 3, the reference circuit 58, FIG. 3, and a resistor 84, FIG. 6. The output from the amplifier circuit 79 is high, as indicated by the dashed line at (C) in FIG. 7, when the write enable signal is high, permitting writing on the data sectors of the disk 1, and low when the write enable signal is low, as indicated by the solid line.

Such output from the amplifier circuit 79 is directed into both comparators 74 and 75 as a reference signal. Thus the comparator 74 compares the FIG. 7 (A) signal with the reference signal whereas the other comparator 75 compares the FIG. 7 (B) signal with the reference signal. The comparator 74 produces pulses on its output line 50, as shown at (D) in FIG. 7, when the reference signal is of greater magnitude than the FIG. 7 (A) signal. The comparator 75 produces pulses on its output line 51, as shown at (E) in FIG. 7, when the reference signal is of greater magnitude than the FIG. 7 (B) signal. The pulses shown at (D) and (E) in FIG. 7 are the gate pulses equivalent to those shown at (G) and (H) in FIG. 4.

As pointed out above, the d.c. component of the FIG. 7 (C) waveform is made higher for the reading and writing of main data, and lower for reading the control data such as the track addresses and servo patterns. With the reference signal applied to the comparators 74 and 75 of the gate pulse circuit 49 thus automatically switched between the two magnitudes, the durations of the gate pulses will change accordingly, as indicated by the solid and dashed lines at (D) and (E) in FIG. 7.

Reference is directed again to FIG. 8 for a more detailed discussion of how the present invention succeeds in reading the control data more accurately than heretofore. At (A) in this figure is shown as aforesaid one of the opposite phase output waveforms of the amplifier circuit 8, FIG. 1, which represent the information from part of one servo sector and part of one data sector of the disk. The read circuit 11 will produce from such opposite phase amplifier outputs the read pulses of FIG. 8 (B) on its output line 13, FIG. 3. The read pulses represent the positive and negative peaks of the input waveforms. Besides being supplied directly to the timing circuit 15 and main data detector circuit 17, both shown in FIG. 1, the read pulses are further directed into the flip flop 70 included in the FIG. 3 read circuit 11.

The flip flop 70 is meant for the production of read pulses used for deriving the control data on the servo sectors of the disk. A study of FIG. 8 will reveal that the control data read pulses at (C) rise in synchronism with those of the read pulses at (B) which correspond to the negative ones of the pairs of positive and negative peaks of the amplifier output at (A) which represent logic ones. All the logic ones in FIG. 8 are each represented by one cycle of alternating current, so that the second, fourth, sixth and like even number read pulses correspond to the negative peaks of the amplifier output.

Generally, in magnetic disks, each bit of the addresses and other control data on the servo sectors of the disk is equivalent in length to a half byte, or four bits, of the main data on the data sectors; in other words, each bit of the main data is only a quarter as long as each bit of the control data. The control data is therefore recorded far more stably than the main data. The control data would be detected less accurately if, as had been widely practiced in the art, the amplifier output waveforms were shaped by comparison with signals of reduced magnitude with a view to accurate detection of the main data.

Take, for example, the detection of a gap in a servo sector. The waves following the gap would tend to extend toward the gap under the influence of the AGC built into the FIG. 1 amplifier circuit 8. The end of the gap would then become indefinite when the waves were shaped by the comparators, making impossible the correct detection of the gap. Also, the gate pulse circuit 49, FIG. 3, would then more readily produce undesired gate pulses in response to noise magnetizations, resulting in errors in reading the track addresses and other control data.

Therefore, in the illustrated disk drive, the reference signal supplied to the positive inputs of the comparators 74 and 75, FIG. 6, of the gate pulse circuit 49 are switched between two magnitudes by utilizing the write enable signal on the line 33, as indicated at (C) in FIG. 7. The durations of the gate or window pulses shown at (D) and (E) in FIG. 7 are reduced for accurately reading the track addresses and other control data. The peak detection of the control data is nevertheless possible since such data is recorded as aforesaid more stably than the main data.

Figure 9:
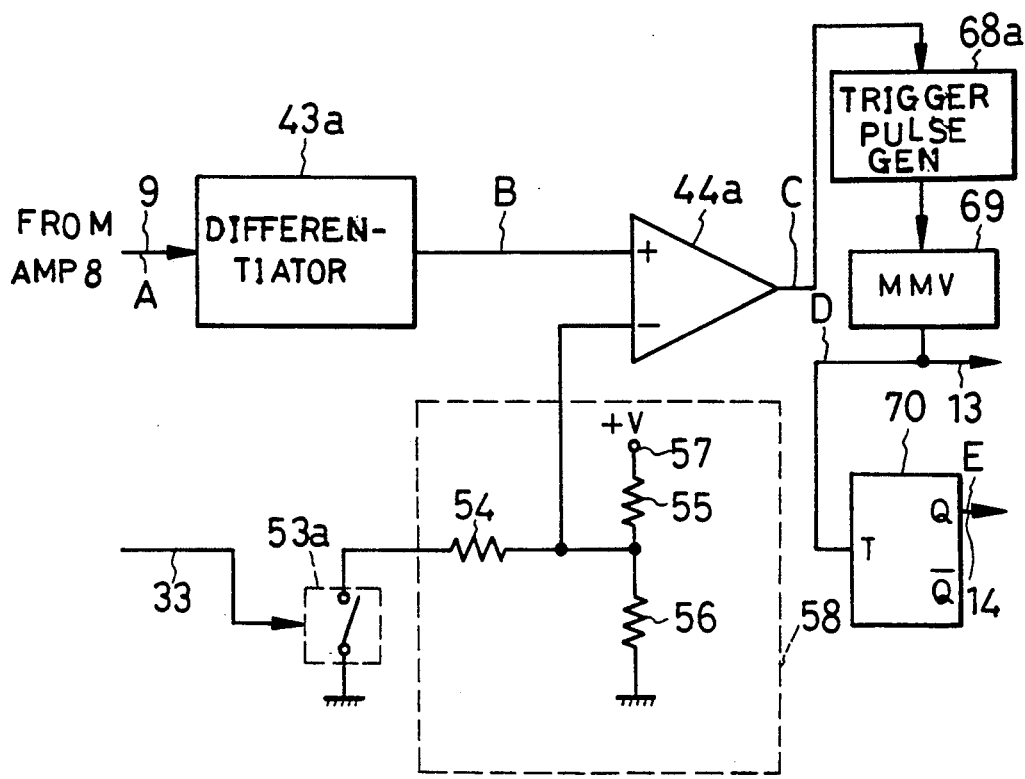
FIG. 9 is a block diagram of an alternate read circuit.
Figure 10:
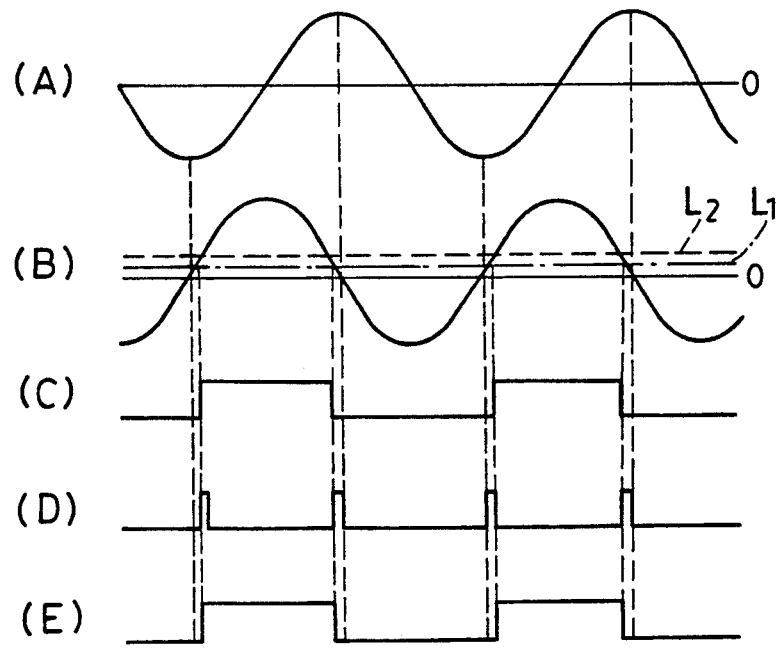
FIG. 10, consisting of (A) through (E), is a series of waveform diagrams useful in explaining the operation of the FIG. 9 read circuit.

FIG. 9 shows an alternate read circuit for use in the FIG. 1 disk drive in place of the read circuit 11 shown therein. FIG. 10 shows at (A) through (E) the waveforms appearing in the correspondingly designated parts of the FIG. 9 circuit. The alternate read circuit includes a differentiator circuit 43a connected to the output line 9 of the amplifier circuit 8 shown in FIG. 1. Inputting the amplifier output shown at (A) in FIG. 10, the differentiator circuit 43a produces an output shown at (B) in FIG. 10.

The differentiator circuit 43a is connected to one input of a comparator 44a, the other input of which is connected to a reference circuit 58 comprising resistors 54, 55 and 56 and a d.c. supply terminal 57. The reference circuit 58 is intended to provide a reference signal of two different magnitudes $L_1$ and $L_2$, shown at (B) in FIG. 10, which are both close to zero. To this end the reference circuit 58 is grounded via an on-off switch 53a which is under the control of the write enable signal supplied from the timing circuit 15, FIG. 1, over the line 33.

The switch 53a is open when the write enable signal is in a state for permitting the writing and reading of data on the data sectors of the disk. The supply terminal 57 of the reference circuit 58 will then be grounded via the two resistors 55 and 56, so that the greater magnitude reference signal $L_2$ will be applied to the comparator 44a for comparison with the differentiator output. The comparator 44a will therefore be unresponsive to low amplitude noise that may be contained in the differentiator output.

The switch 53a is closed during the reading of the servo sectors. Then the supply terminal 57 of the reference circuit 58 will be additionally grounded via the resistor 54, so that the smaller magnitude reference signal $L_1$ will be applied to the comparator 44a. The noise margin of the read circuit will then be reduced. However, in this case, the output from the comparator 44a, shown at (C) in FIG. 10, will better correspond to the peaks of the amplifier output waveform.

The output of the comparator 44a is connected to a trigger pulse generator circuit 68a and thence to an MMV 69. The output from this MMV, shown at (D) in FIG. 10, is the desired read pulses for delivery to both timing circuit 15 and main data detector circuit 17 of FIG. 1. The read pulses are further directed into a flip flop 70 for the provision of the address read signal which is sent to the address detector circuit 16, FIG. 1, over the line 14.

The rises of the read pulses shown at (D) in FIG. 10 represent the peaks of the amplifier output at (A) in FIG. 10. The difference in time between the read pulse rises and the amplifier output peaks is less when the transducer is reading the control data than when it is reading the main data, so that the control data can be read more precisely without in any way sacrificing the recovery of the main data in the usual way.

Despite the foregoing detailed disclosure, it is not desired that the present invention be limited by the exact details of the illustrated embodiment. A variety of modifications, alterations and adaptations of the invention will suggest themselves for those skilled in the art within the broad teaching hereof. For example, although FIG. 1 shows the timing circuit 15, address detector circuit 16 and main data detector circuit 17 as separate parts, these circuits could be integrated into a single circuit or incorporated in the microcomputer 19.

It will also be apparent that the invention could be applied to magneto-optic and other types of storages.

What is claimed is:

1. An apparatus have a transducer for data transfer with a rotating disk having a multiplicity of annular tracks arranged concentrically thereon, each track being divided into a plurality of data sectors for the storage of main data and a plurality of servo sectors for the storage of control data comprising track addresses, wherein the improvement resides in a system for producing read pulses indicative of peaks of a waveform produced by the transducer on reading the disk, comprising:
   (a) reference circuit means for providing a reference signal;
   (b) reference signal setting means for setting the reference signal at a first predetermined magnitude when the transducer output waveform represents the main data, and at a second magnitude, different from the first magnitude, when the transducer output wave-form represents the control data, the reference signal setting means being connected to the reference circuit means;
   (c) comparator means connected to the transducer and the reference circuit means for comparing the transducer output waveform with the reference signal and for producing output pulses indicative of whether the transducer output waveform is greater than the reference signal, the output pulses of the comparator means having either of two different durations depending upon whether the reference signal has the first or the second magnitude; and
   (d) circuit means connected to the comparator means for producing read pulses from the output pulses of the comparator means.

2. An apparatus having a transducer for data transfer with a rotating disk having a multiplicity of annular tracks arranged concentrically thereon, each track being divided into a plurality of data sectors for the storage of main data and plurality of servo sectors for the storage of control data comprising track addresses, wherein the improvement resides in a system for producing read pulses indicative of peaks of a waveform produced by the transducer on reading the disk, comprising:
   (a) reference circuit means for providing a reference signal;
   (b) reference signal setting means for setting the reference signal at a first predetermined magnitude when the transducer output waveform represents the main data, and at a second magnitude, different from the first magnitude, when the transducer output wave-form represents the control data, the reference signal setting means being connected to the reference circuit means;
   (c) comparator means connected to the transducer and the reference circuit means for comparing the transducer output waveform with the reference signal and for producing gate pulses having either of two different durations depending upon whether the reference signal has the first or the second magnitude;
   (d) wave shaping circuit means connected to the transducer for producing data pulses which rise and decay in synchronism with the peaks of the transducer output waveform; and
   (e) circuit means connected to the comparator and the wave shaping circuit means for ascertaining whether the data pulses rise and decay within the durations of the gate pulses and, if they do, for producing read pulses indicative of the rises and decays of the data pulses.

3. The apparatus of claim 2 wherein the reference signal setting means comprises:
   (a) an NOT circuit having an output connected to the reference circuit means; and
   (b) a timing circuit for producing a write enable signal in response to the read pulses, the timing circuit being connected to the input of the NOT circuit for applying thereto the write enable signal.

4. The apparatus of claim 3 wherein the reference circuit means comprises full wave rectifier means for providing the reference signal by full wave rectification of the transducer output.

5. An apparatus having a transducer for data transfer with a rotating disk having a multiplicity of annular tracks arranged concentrically thereon, each track being divided into a plurality of data sectors for the storage of main data and a plurality of servo sectors for the storage of control data comprising track addresses, wherein the improvement resides in a system for producing read pulses indicative of peaks of a waveform produced by the transducer on reading the disk, comprising:
   (a) a differentiator circuit connected to the transducer for providing an output by differentiating the transducer output waveform;
   (b) reference circuit means for providing a reference signal;
   (c) reference signal setting means for setting the reference signal at a first predetermined magnitude when the transducer output waveform represents the main data, and at a second magnitude, different from the first magnitude, when the transducer output wave-form represents the control data, the reference signal setting means being connected to the reference circuit means;
   (d) a comparator connected to the differentiator circuit and the reference circuit means for comparing the output from the differentiator circuit with the reference signal and for producing output pulses indicative of whether the differentiator circuit output is greater than the reference signal, the output pulses of the comparator having either of two different durations depending upon whether the reference signal has the first of the second magnitude; and
   (e) circuit means connected to the comparator for producing read pulses from the output pulses of the comparator.

6. The apparatus of claim 5 wherein the reference circuit means comprises:
   (a) a d.c. supply terminal;
   (b) a first resistor connected to the d.c. supply terminal; and
   (c) a second resistor between the first resistor and ground,
   and wherein the reference signal setting means comprises:
   (a) an on-off switch connected between the reference circuit means and ground; and
   (b) a timing circuit for producing a write enable signal in response to the read pulses, the timing circuit being connected to the switch for on-off control thereof by the write enable signal.

* * * * *